United States Patent
Hong et al.

(10) Patent No.: US 12,127,089 B2
(45) Date of Patent: Oct. 22, 2024

(54) EVENT NOTIFICATION METHOD, APPARATUS AND STORAGE MEDIUM

(71) Applicant: ZTE CORPORATION, Guangdong (CN)

(72) Inventors: Yingjie Hong, Guangdong (CN); Jinguo Zhu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 396 days.

(21) Appl. No.: 17/599,191

(22) PCT Filed: Mar. 30, 2020

(86) PCT No.: PCT/CN2020/082036
§ 371 (c)(1),
(2) Date: Sep. 28, 2021

(87) PCT Pub. No.: WO2020/192787
PCT Pub. Date: Oct. 1, 2020

(65) Prior Publication Data
US 2022/0191665 A1 Jun. 16, 2022

(30) Foreign Application Priority Data
Mar. 28, 2019 (CN) .......................... 201910241964.8

(51) Int. Cl.
*H04W 4/60* (2018.01)
*H04W 8/20* (2009.01)
*H04W 24/08* (2009.01)

(52) U.S. Cl.
CPC .............. *H04W 4/60* (2018.02); *H04W 8/20* (2013.01); *H04W 24/08* (2013.01)

(58) Field of Classification Search
CPC .......... H04W 4/60; H04W 8/20; H04W 24/08
See application file for complete search history.

(56) References Cited

U.S. PATENT DOCUMENTS

2018/0270778 A1   9/2018  Bharatia
2020/0383086 A1* 12/2020  Ianev ................ H04W 52/0235
(Continued)

FOREIGN PATENT DOCUMENTS

CN   109413619 A   3/2019
CN   109417534 A   3/2019
(Continued)

OTHER PUBLICATIONS

WIPO, International Search Report issued on Jun. 15, 2020.
(Continued)

*Primary Examiner* — Walter J Divito
(74) *Attorney, Agent, or Firm* — Li & Cai Intellectual Property (USA) Office

(57) ABSTRACT

Disclosed are an event notification method and apparatus as well as a storage medium. The method includes: acquiring, by an NEF according to a second event notification from an SMF, information of an AF sending downlink data, wherein the second event is an event of monitoring whether the AF sends downlink data, and the first event is a UE availability after DDN failed event; and receiving, by the NEF, a first event notification from the AMF, and sending the first event notification to the AF sending downlink data according to the acquired information thereof.

16 Claims, 7 Drawing Sheets

(56) References Cited

U.S. PATENT DOCUMENTS

| | | | |
|---|---|---|---|
| 2021/0076192 A1* | 3/2021 | Wu | H04L 67/53 |
| 2021/0144624 A1* | 5/2021 | Jain | H04W 48/02 |
| 2021/0329504 A1* | 10/2021 | Wu | H04W 4/12 |

FOREIGN PATENT DOCUMENTS

| | | | |
|---|---|---|---|
| CN | 110536282 A | | 12/2019 |
| EP | 3447997 A1 | | 2/2019 |
| WO | WO2018127148 A1 | | 7/2018 |

OTHER PUBLICATIONS

Huawei, et al., "Procedure of availability after DDN failure notification for multiple AFs", 3GPP TSG-SA2 Meeting #131, dated Mar. 1, 2019.

European Patent Office, Extended European Search Report dated Nov. 29, 2022, for corresponding EP application No. 20779067.6.

ZTE, "Update of Solution 39 UE availability after DDN failure for multiple AFS", 3GPP Draft, Oct. 18, 2018.

Huawei, et al., "Procedure of Availability after DDN failure notification for multiple AFs", 3GPP TSG-SA2 Meeting #131, Mar. 1, 2019.

"Study on Cellular Internet of Things (IoT) support and evolution for the 5G System", 5GPP, TR23.724 v16.0.0, Dec. 19, 2018.

Korean Patent Office, First office action dated Nov. 28, 2022, for corresponding KR application No. 10-2021-7034595.

* cited by examiner

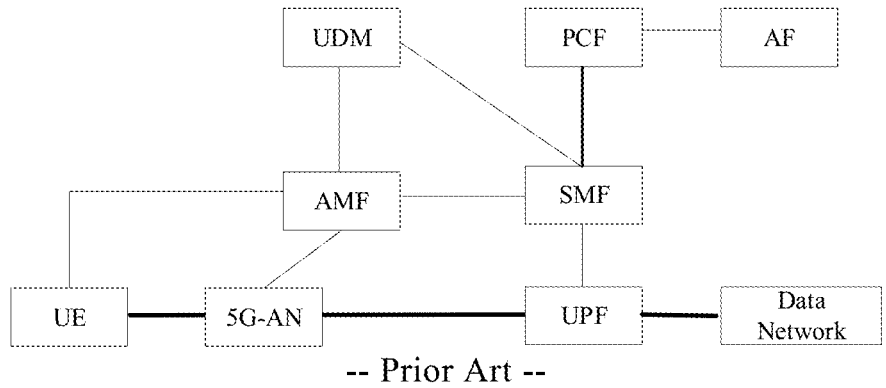

-- Prior Art --

FIG. 1

```
                                                            200
┌─────────────────────────────────────────────────────────────┐
│ acquire, by an NEF according to a second event notification │
│ from an SMF, information of an AF sending downlink data,    │
│ wherein the second event is an event of monitoring whether  │
│ the AF sends downlink data, and the first event is a UE     │
│ availability after DDN failed event                         │
└─────────────────────────────────────────────────────────────┘
                              │
                              ▼                         201
┌─────────────────────────────────────────────────────────────┐
│ receive, by the NEF, a first event notification from the    │
│ AMF, and send, by the NEF, the first event notification to  │
│ the AF sending downlink data according to the acquired      │
│ information thereof                                         │
└─────────────────────────────────────────────────────────────┘
```

FIG. 2

EVENT NOTIFICATION METHOD, APPARATUS AND STORAGE MEDIUM

CROSS-REFERENCE TO RELATED APPLICATION

The present application claims priority from the Chinese patent application No. 201910241964.8, filed with the China Patent Office on Mar. 28, 2019, the entire contents of which are incorporated in the present application by reference.

TECHNICAL FIELD

The present application relates to wireless communication technologies, and for example, relates to an event notification method and apparatus as well as a storage medium.

BACKGROUND

Generally, a User Equipment (UE) is not always in a connected state for reasons such as power saving, but the Application Function (AF) will not know the current state of the UE. Therefore, in order to effectively enable the AF to send DownLink data (or DL data) to the UE, the AF may subscribe to a UE availability after DDN failed event from the Access Management Function (AMF). In this manner, when the UE is switched from an unreachability state to an availability state, the AMF will send a UE availability notification message via a Network Exposure Function (NEF) to each AF that has subscribed to the UE availability after DDN failed event, thereby ensuring that the AF sends data to the UE after learning that the UE is available. The general process includes: supposing that one AF sends DL Data service requirements at a time, a User Plane Function (UPF), after receiving the requirements, sends a Downlink Data Notify (DDN) message to the AMF to notify the AMF that there is downlink data to be sent and the UE needs to be awakened; the AMF, if fails to wake up the UE, returns a DDN failure response; and when the UE is switched from an unreachability state to an availability state, the AMF sends a UE availability notification message to each AF that has subscribed to the UE availability after DDN failed event.

In view of the event notification implementations provided by the existing art, when the UE is switched from an unreachability state to an availability state, the AMF sends a UE availability notification message to each AF that has subscribed to the UE availability after DDN failed event. However, not all AFs need to receive the notification message of UE availability. Therefore, the event notification manner of UE availability in the existing art causes waste of network resources.

SUMMARY

The present application provides an event notification method and apparatus as well as a storage medium which avoid waste of network resources.

The present application provides an event notification method, including: acquiring, by a Network Exposure Function (NEF) according to a second event notification from a Session Management Function (SMF), information of an Application Function (AF) sending downlink data; receiving, by the NEF, a first event notification from an Access Management Function (AMF), and sending the first event notification to the AF sending downlink data according to the acquired information thereof; wherein the second event is an event of monitoring whether the AF sends downlink data, and the first event is a UE availability after DDN failed event.

In an exemplary implementation, the step of acquiring information of the AF sending downlink data includes: receiving, by the NEF, the second event notification carrying an AF identifier or an identifier associated with the AF from the SMF; and setting, by the NEF according to the received AF identifier or the identifier associated with the AF, a Notify-on-available-after-DDN-failure identifier associated with the AF.

In an exemplary implementation, before acquiring information of the AF sending downlink data, the method further includes: receiving, by the NEF, an event subscription request sent from the AF, and generating, by the NEF, an NEF reference ID, wherein the NEF reference ID is associated with the AF identifier; and sending, by the NEF, an event subscription request to a Unified Data Management (UDM) function.

In an exemplary implementation, the event subscription request from the AF carries information including: a first subscription event type, an AF identifier and a UE identifier; and the event subscription request sent from the NEF to the UDM carries information including: the NEF reference ID, a first subscription event type, and notification endpoint information.

In an exemplary implementation, before acquiring information of the AF sending downlink data, the method further includes: receiving, by the NEF, an event subscription request carrying a first subscription event type and an AF identifier from the AF, or receiving, by the NEF, an event subscription request carrying a second subscription event type and an AF identifier from the AF; generating, by the NEF, an NEF reference ID, wherein the NEF reference ID is associated with the AF identifier; and sending, by the NEF, an event subscription request to a Policy Control Function (PCF).

In an exemplary implementation, the event subscription request sent from the NEF to the PCF carries information including: the NEF reference ID, a second subscription event type, and notification endpoint information.

In an exemplary implementation, the first subscription event type includes: a UE availability after DDN failure type; and the second subscription event type includes: a downlink data delivery status type.

The present application provides a computer-readable storage medium with computer executable instructions stored thereon, wherein the computer executable instructions are configured to perform any one of the event notification methods as described above.

The present application provides an apparatus for implementing event notification, including a processor and a memory, wherein the memory has stored there on a computer program executable on the processor and configured to: perform any one of the event notification methods as described above.

The present application provides another event notification method, including: acquiring, by an Access Management Function (AMF) according to a second event notification from a Session Management Function (SMF), information of an Application Function (AF) sending downlink data; sending, by the AMF via a Network Exposure Function (NEF) according to the acquired information of the AF sending downlink data, a first event notification to the AF sending downlink data; wherein the second event is an event of monitoring whether the AF sends downlink data, and the first event is a UE availability after DDN failed event.

In an exemplary implementation, the step of acquiring information of the AF sending downlink data includes: receiving, by the AMF, the second event notification carrying an AF identifier or an identifier associated with the AF from the SMF; and setting, by the AMF according to the received AF identifier or the identifier associated with the AF, a Notify-on-available-after-DDN-failure identifier associated with the AF.

In an exemplary implementation, the step of sending, by the AMF via the NEF, the first event notification to the AF sending downlink data includes: sending, by the AMF via the NEF when the AMF detects that the UE is switched from an unreachability state to an availability state, the first event notification to the AF sending downlink data according to the Notify-on-available-after-DDN-failure identifier.

In an exemplary implementation, before acquiring information of the AF sending downlink data, the method further includes: receiving, by the AMF, a first event subscription request from a Unified Data Management (UDM) function for subscribing the first event, and completing subscription of the first event; wherein the first event subscription request carries information including: an NEF reference ID, a first subscription event type, notification endpoint information and monitoring endpoint information.

The present application provides a computer-readable storage medium with computer executable instructions stored thereon, wherein the computer executable instructions are configured to perform any one of the another event notification methods as described above.

The present application provides an apparatus for implementing event notification, including a processor and a memory, wherein the memory has stored thereon a computer program executable on the processor and configured to: perform any one of the another event notification methods as described above.

The present application provides an event notification apparatus, including: an association module and a first notification module; The association module is configured to acquire, according to a second event notification from a Session Management Function (SMF), information of an Application Function (AF) sending downlink data; wherein the second event is an event of monitoring whether the AF sends downlink data, and the first event is a UE availability after DDN failed event; and the first notification module is configured to send the first event notification to the AF sending downlink data according to the acquired information thereof.

In an exemplary implementation, acquiring information of the AF sending downlink data by the association module includes: receiving the second event notification carrying an AF identifier or an identifier associated with the AF from the SMF; and setting, according to the received AF identifier or the identifier associated with the AF, a Notify-on-available-after-DDN-failure identifier associated with the AF.

In an exemplary implementation, the event notification apparatus is provided in a Network Exposure Function (NEF), or the event notification apparatus is an NEF.

In an exemplary implementation, the first notification module is configured to: receive a first event notification from an Access Management Function (AMF), and send the first event notification to the AF sending downlink data according to the information thereof.

In an exemplary implementation, the event notification apparatus is provided in the AMF, or the event notification apparatus is an AMF.

In an exemplary implementation, the first notification module is configured to: send, via a Network Exposure Function (NEF) according to the acquired information of the AF sending downlink data, the first event notification to the AF sending downlink data.

The present application provides yet another event notification method, including: receiving, by a Session Management Function (SMF) a second event subscription request, and completing subscription of the second event; wherein the second event is an event of monitoring whether the AF sends downlink data, and sending, by the SMF when an Application Function (AF) sends downlink data to a UE but the UE is in an unreachability state, the second event notification to a Network Exposure Function (NEF) or an Access Management Function (AMF); wherein the second event notification is configured to notify the NEF or the AMF of information of the AF sending downlink data.

In an exemplary implementation, the step of receiving, by the SMF, the second event subscription request, and completing subscription of the second event includes: receiving, by the SMF, a second event subscription request from a Unified Data Management (UDM) function, and completing subscription of the second event; wherein the second event subscription request carries information including: a first subscription event type, notification endpoint information configured to an NEF-related address, and an AF identifier.

In an exemplary implementation, the step of receiving, by the SMF, the second event subscription request, and completing subscription of the second event includes: receiving, by the SMF, a second event subscription request from the AMF, and completing subscription of the second event; wherein the second event subscription request carries information including: a first or second subscription event type, notification endpoint information configured to an AMF-related address, and an AF identifier.

In an exemplary implementation, the step of receiving, by the SMF, the second event subscription request, and completing subscription of the second event includes: receiving, by the SMF, a second event subscription request from a Policy Control Function (PCF), and completing subscription of the second event; wherein the second event subscription request carries information including: a second subscription event type, notification endpoint information configured to an NEF-related address, and an AF identifier.

In an exemplary implementation, the first subscription event type includes: a UE availability after DDN failure type; and the second subscription event type includes: a downlink data delivery status type.

In an exemplary implementation, the step of sending, by the SMF, the second event notification to the NEF or the AMF includes: acquiring, by the SMF when learning that the UE is currently in an unreachability state and receiving downlink data detection information from a User Plane Function (UPF), a subscription event associated with the AF identifier according to the AF identifier contained in the downlink data detection information; sending, by the SMF to the NEF or the AMF according to the notification endpoint information of the subscription event associated with the AF identifier, a second event notification carrying an AF identifier or an identifier associated with the AF; or, acquiring, by the SMF when detecting that the downlink data of the AF is in a cache state, the subscription event associated with the AF identifier according to the AF identifier; and sending, by the SMF to the NEF or the AMF according to the notification endpoint information of the subscription event associated with the AF identifier, a second event notification carrying an AF identifier or an identifier associated with the AF.

In an exemplary implementation, before sending, by the SMF, the second event notification to the NEF or the AMF, the method further includes: requesting the UPF by the SMF to send downlink data detection information including an AF identifier; or, informing the UPF by the SMF to perform downlink data caching.

The present application provides a computer-readable storage medium with computer executable instructions stored thereon, wherein the computer executable instructions are configured to perform any one of the yet another event notification methods as described above.

The present application provides an apparatus for implementing event notification, including a processor and a memory, wherein the memory has stored there on a computer program executable on the processor and configured to: perform any one of the yet another event notification methods as described above.

The present application provides an event notification apparatus, including: a processing module and a second notification module; wherein the processing module is configured to receive a second event subscription request, and complete subscription of the second event; wherein the second event is an event of monitoring whether the AF sends downlink data, and the second notification module is configured to send, when an Application Function (AF) sends downlink data to a UE but the UE is in an unreachability state, the second event notification to a Network Exposure Function (NEF) or an Access Management Function (AMF); wherein the second event notification is configured to notify the NEF or the AMF of information of the AF sending downlink data.

In an exemplary implementation, the event notification apparatus is provided in a Session Management Function (SMF), or the event notification apparatus is an SMF.

In an exemplary implementation, the processing module is specifically configured to: receive a second event subscription request from a Unified Data Management (UDM) function, and complete subscription of the second event; wherein the second event subscription request carries information including: a first subscription event type, notification endpoint information configured to an NEF-related address, and an AF identifier, or, receive a second event subscription request from the AMF, and complete subscription of the second event; wherein the second event subscription request carries information including: a first or second subscription event type, notification endpoint information configured to an AMF-related address, and an AF identifier.

In an exemplary implementation, the second notification module is specifically configured to: acquire, when learning that the UE is currently in an unreachability state and receiving downlink data detection information from a User Plane Function (UPF), a subscription event associated with the AF identifier according to the AF identifier contained in the downlink data detection information; send to the NEF or the AMF, according to the notification endpoint information of the subscription event associated with the AF identifier, a second event notification carrying an AF identifier or an identifier associated with the AF; or, acquire, when detecting that the downlink data of the AF is in a cache state, the subscription event associated with the AF identifier via the AF identifier; and send to the NEF or the AMF, according to the notification endpoint information of the subscription event associated with the AF identifier, the second event notification carrying an AF identifier or an identifier associated with the AF.

In an exemplary implementation, the second notification module is further configured to: request the UPF to send downlink data detection information including an AF identifier; or inform the UPF to perform downlink data caching.

An event notification method provided by the application includes: acquiring, by an NEF according to a second event notification, information of an AF sending downlink data; wherein the second event is an event of monitoring whether the AF sends downlink data, and the first event is a UE availability after DDN failed event; receiving, by the NEF, a first event notification from the AMF, and sending the first event notification to the AF sending downlink data according to the acquired information thereof. According to the present application, information of the AF sending downlink data is learned through the second event notification, thereby ensuring that the first event notification is sent to the desired AF, and waste of network resources is avoided.

Another event notification method provided by the application includes: acquiring, by an AMF according to a second event notification, information of an AF sending downlink data; wherein the second event is an event of monitoring whether the AF sends downlink data, and the first event is a UE availability after DDN failed event; sending, by the AMF via an NEF according to the acquired information of the AF sending downlink data, a first event notification to the AF sending downlink data. According to the present application, information of the AF sending downlink data is learned through the second event notification, thereby ensuring that the first event notification is sent to the desired AF, and waste of network resources is avoided.

Yet another event notification method provided by the application includes: receiving, by an SMF, a second event subscription request, and completing subscription of the second event; wherein the second event is an event of monitoring whether the AF sends downlink data, and sending, by the SMF when the AF sends downlink data to a UE but the UE is in an unreachability state, the second event notification to an NEF or an AMF. According to the present application, information of the AF sending downlink data is learned through the second event notification, thereby ensuring that the subsequent first event notification is sent to the desired AF, and waste of network resources is avoided.

BRIEF DESCRIPTION OF THE DRAWINGS

FIG. 1 is a schematic diagram illustrating an architecture of a next generation radio access network in the existing art;

FIG. 2 is a schematic flowchart of an event notification method according to an embodiment of the present application;

DETAILED DESCRIPTION

Figure 3:
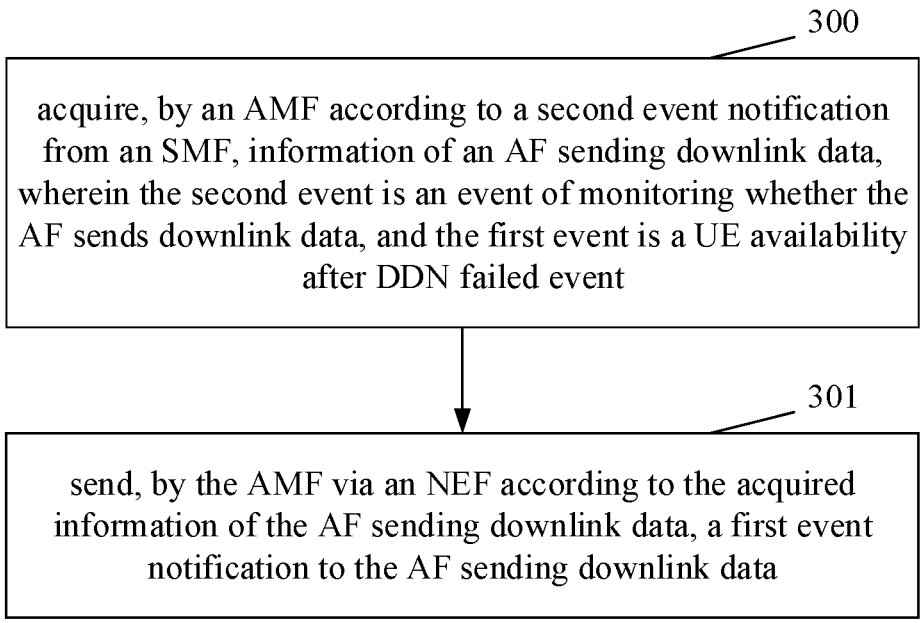
FIG. 3 is a schematic flowchart of another event notification method according to an embodiment of the present application.

In various implementations of the present application, a computing device includes one or more Central Processing Units (CPUs), an input/output interface, a network interface, and a memory.

The memory may include a volatile memory, Random Access Memory (RAM), and/or a non-volatile memory such as Read-Only Memory (ROM) or flash RAM in a computer-readable medium. Memory is an example of the computer-readable medium.

The computer-readable medium includes persistent and non-persistent, removable and non-removable media that can realize information storage in any method or by any technique. The information may be computer-readable instructions, data structures, program modules, or other data. Examples of computer storage media include, but are not limited to, Phase Change RAM (PRAM), Static RAM (SRAM), Dynamic RAM (DRAM), other types of RAM, Read-Only Memory (ROM), Electrically Erasable Programmable Read-Only Memory (EEPROM), flash memory or other memory technology, Compact Disc-ROM (CD-ROM), Digital Video Disc (DVD) or other optical storage, magnetic cassettes, tape disk storage or other magnetic storage devices, or any other non-transmission medium, which can be configured to store information that can be accessed by a computing device. As defined herein, the computer-readable medium does not include transitory computer-readable media (transitory media) such as modulated data signals and carrier waves.

Embodiments of the present application will be described below with reference to the accompanying drawings.

In order to maintain the competitiveness of the 3rd Generation mobile communication system in the communication field, and provide mobile communication services with higher rate, lower latency and more customization for the user while reducing the operation cost of the operator, the 3rd Generation Partnership Project (3GPP) standard working group are dedicated in the research of the next generation radio mobile access networks. The next generation Radio Access Network (RAN) supports multiple types of radio networks to access a unified Core Network (CN), and expects minimum coupling between the RAN and the CN. That is, a terminal can access the unified CN regardless of the access technology of the RAN. The core network function of the next generation radio access network supports a service-based interface in order to support a more flexible deployment scheme. FIG. 1 is a schematic diagram illustrating an architecture of a next generation radio access network in the existing art. As shown in FIG. 1, main Network Functions (NFs) are introduced below.

Access Management Function (AMF) is one of the common control plane functions in a core network, and terminates Non-Access Stratum (NAS) messages between all users and the network. One user equipment (UE) has only one AMF for implementing user mobility management, UE status (e.g., reachability) management, and the like. Session Management Function (SMF) is used for session establishment, modification, deletion, Policy Control Function (PCF) charging, policy execution, and the like. PCF is used for making a policy for the terminal according to subscription of the user, a current position of the UE and information related to application, including a routing policy, a quality of service policy, a charging policy and the like. Unified Data Management (UDM) function may be used for unified management of data, such as permanent storage of user subscription data. Unified Data Repository (UDR) is mainly used for storing user subscription data, policy data and the like managed by UDM and PCF. User Plane Function (UPF) in the core network, as an anchor of the user plane of the core network, is an interface for data transmission with an external Data Network (DN), and executes the PCF policy rules on the user plane part. Network Exposure Function (NEF) is configured to expose capabilities and events of 3GPP NFs to other NFs or external Application Functions (AFs), and provide an AF to pre-configure the capabilities of the 3GPP NFs, and implement mapping of information between a 3GPP network and an external network. AF refers to an application accessing 3GPP, and DN refers to a data network accessing 3GPP.

FIG. 2 is a schematic flowchart of an event notification method according to the present application, which, as shown in FIG. 2, includes the following steps 200 to 201.

At step 200: an NEF acquires, according to a second event notification from an SMF, information of an AF sending downlink data. The second event is an event of monitoring whether the AF sends downlink data, and the first event is a UE availability after DDN failed event.

In an exemplary implementation, when the AF sends downlink data to a UE but the UE is in an unreachability state, the SMF sends the second event notification to an NEF, so as to inform the NEF to associate the first event with an AF to receive the first event notification, i.e., to determine which AF needs to receive the first event notification.

In an exemplary implementation, the step of acquiring information of the AF sending downlink data in this step includes: receiving, by the NEF from the SMF, a second event notification carrying an AF identifier or an identifier associated with the AF; setting, by the NEF according to the received AF identifier or the identifier associated with the AF, a Notify-on-available-after-DDN-failure identifier associated with the AF identifier. That is, the Notify-on-available-after-DDN-failure identifier is associated with the AF.

Here, the Notify-on-available-after-DDN-failure identifier is associated with the first event. In other words, if the Notify-on-available-after-DDN-failure identifier is set, the first event notification indicating subsequent first events need to be sent to the associated AF.

In an exemplary implementation, before this step, the method may further include the following steps: the NEF receives an event subscription request, such as Nnef_EventExposure_Subscribe request, sent from the AF, and the NEF generates an NEF reference Identifier or NEF reference ID that is associated with the AF identifier. The event subscription request from the AF carries information including, for example, a first subscription event type (e.g., "availability after DDN failure"), information for identifying the AF (e.g., traffic descriptor, Internet Protocol filter information or IP filter information, an AF ID, or other information that can uniquely identify the AF identity in the entire system, which may also be referred to as AF identifier herein), a UE identifier, and the like.

The NEF sends an event subscription request, such as Nudm_EventExposure_subscribe request, to the UDM, and the event subscription request from the NEF carries information including, for example, an NEF reference ID, subscription event type information (such as Event ID, a first subscription event type "availability after DDN failure", or the like), notification endpoint information (e.g., related information such as an address of the NEF for receiving an event notification), and the like.

In an exemplary implementation, before this step, the method may further include the following steps: the NEF receives an event subscription request, such as Nnef_EventExposure_Subscribe request, sent from the AF, and the event subscription request from the AF carries information including, for example, a first subscription event type (e.g., "UE availability after DDN failure"), information for identifying the AF (e.g., traffic descriptor, IP filter information, an AF ID, or other information that can uniquely identify the AF identity in the entire system, such information may also be referred to as AF identifier), a UE identifier, and the like. Alternatively, the NEF receives an event subscription request, such as Nnef_EventExposure_Subscribe request, sent from the AF, and the event subscription request from the AF carries information including, for example, a second subscription event type (e.g., downlink data delivery status type), information for identifying the AF (e.g., traffic descriptor, IP filter information, an AF ID, or other information that can uniquely identify the AF identity in the entire system, such information may also be referred to as AF identifier), a UE identifier, and the like.

The NEF generates an NEF reference ID that is associated with the AF identifier.

The NEF sends an event subscription request, such as Npcf_EventExposure_subscribe request, to the PCF, and the event subscription request from the NEF carries information including, for example: an NEF reference ID, subscription event type information (such as Event ID, a second subscription event type "Downlink data delivery status", or the like), notification endpoint information (e.g., related information such as an address of the NEF for receiving an event notification), and the like.

The NEF may receive an event subscription response from the PCF.

In an exemplary implementation, the NEF returns an event subscription response to the AF.

Different actions are performed for different subscription event types.

At step 201: the NEF receives a first event notification from the AMF, and sends the first event notification to the AF sending downlink data according to the acquired information of the AF sending downlink data.

In an exemplary implementation, upon detecting that the UE is switched from an unreachability state to an availability state, the AMF sends the first event notification to the NEF.

An embodiment of the present disclosure further provides a computer readable storage medium with computer executable instructions stored thereon. The computer executable instructions are configured to perform the event notification method described in any one of the embodiments related to FIG. 2.

An embodiment of the present disclosure further provides an apparatus for implementing event notification, including a processor and a memory. The memory has stored thereon a computer program executable on the processor and configured to: perform steps of the event notification method described in any one of the embodiments related to FIG. 2.

FIG. 3 is a schematic flowchart of another event notification method according to the present application. As shown in FIG. 3, the method includes the following steps 300 to 301.

At step 300: the AMF acquires, according to a second event notification from an SMF, information of an AF sending downlink data. The second event is an event of monitoring whether the AF sends downlink data, and the first event is a UE availability after DDN failed event.

In an exemplary implementation, when the AF sends downlink data to a UE but the UE is in an unreachability state, the SMF sends the second event notification to the AMF, so as to inform the AMF to associate the first event with an AF to receive the first event notification, i.e., to determine which AF needs to receive the first event notification.

In an exemplary implementation, acquiring information of the AF sending downlink data in this step includes the following steps: the AMF receives the second event notification carrying an AF identifier or an identifier associated with the AF from the SMF; and the AMF sets, according to the received AF identifier or the identifier associated with the AF, a Notify-on-available-after-DDN-failure identifier associated with the AF.

Here, the Notify-on-available-after-DDN-failure identifier is associated with the first event. In other words, if the Notify-on-available-after-DDN-failure identifier is set, the first event notification indicating subsequent first events need to be sent to the associated AF.

In an exemplary implementation, before this step, the method may further include the following step: the AMF receives a UE paging request (Namf_CommunicationN1N2MessageTransfer request) from the SMF and pages the UE; and the AMF feeds back to the SMF, when the UE is in an unreachability state, a response message (Namf_CommunicationN1N2MessageTransfer response) indicating that the UE is currently in an unreachability state.

In an exemplary implementation, before this step, the method further includes the following step: the AMF receives a first event subscription request from the UDM, and completes subscription of the first event. The first event subscription request carries information including, for example: an NEF reference ID, subscription Event type information (such as an Event ID, a first subscription event type such as "availability after DDN failure", or the like), notification endpoint information (e.g., related information such as an address of the NEF for receiving the first event notification), monitoring endpoint information (e.g., UE identifier), or the like.

The AMF may return a first event subscription response to the UDM.

At step 301, the AMF sends, via an NEF according to the acquired information of the AF sending downlink data, a first event notification to the AF sending downlink data.

In an exemplary implementation, this step may include the following step: upon detecting that the UE is switched from an unreachability state to an availability state, the AMF, according to the set Notify-on-available-after-DDN-failure identifier and via the NEF, the first event notification to an AF associated with the Notify-on-available-after-DDN-failure identifier.

An embodiment of the present disclosure further provides a computer readable storage medium with computer executable instructions stored thereon. The computer executable instructions are configured to perform the event notification method described in any one of the embodiments related to FIG. 3.

An embodiment of the present disclosure further provides an apparatus for implementing event notification, including a processor and a memory. The memory has stored thereon a computer program executable on the processor and configured to: perform steps of the event notification method described in any one of the embodiments related to FIG. 3.

Figure 4:
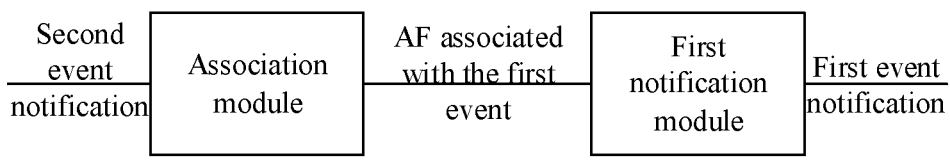
FIG. 4 is a schematic diagram illustrating configuration of an event notification apparatus according to an embodiment of the present application.

FIG. 4 is a schematic diagram illustrating configuration of an event notification apparatus according to the present application, which, as shown in FIG. 4, includes at least an association module and a first notification module. The association module is configured to acquire, according to a second event notification from an SMF, information of an AF sending downlink data. The second event is an event of monitoring whether the AF sends downlink data, and the first event is a UE availability after DDN failed event. The first notification module is configured to send the first event notification to the AF sending downlink data according to the acquired information of the AF sending downlink data.

In an exemplary implementation, acquiring information of the AF sending downlink data by the association module includes: receiving the second event notification carrying an AF identifier or an identifier associated with the AF from the SMF; and setting, according to the received AF identifier or the identifier associated with the AF, a Notify-on-available-after-DDN-failure identifier associated with the AF.

The event notification apparatus of the present application may be provided in the NEF or may be an NEF, in which case: in an exemplary implementation, the first notification module is configured to: receive a first event notification from the AMF, and send the first event notification to the AF sending downlink data according to the information of the AF sending downlink data.

The event notification apparatus of the present application may be provided in the AMF or may be an AMF, in which case: in an exemplary implementation, the first notification module is configured to: send the first event notification via the NEF to the AF sending downlink data according to the information of the AF sending downlink data.

Figure 5:
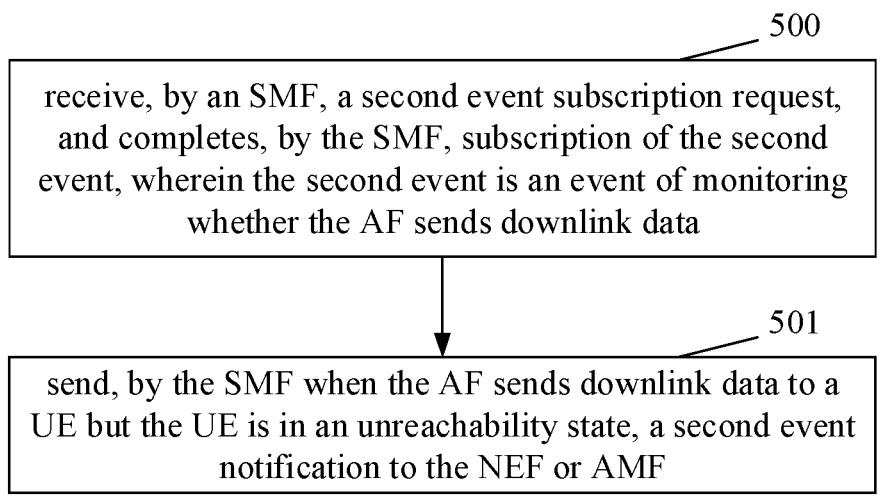
FIG. 5 is a schematic flowchart of yet another event notification method according to an embodiment of the present application.

FIG. 5 is a schematic flowchart of yet another event notification method according to the present application, which, as shown in FIG. 5, includes the following steps 500 to 501.

At step 500: an SMF receives a second event subscription request, and completes subscription of the second event. The second event is an event of monitoring whether the AF sends downlink data.

In an exemplary implementation, this step may include the following step: the SMF receives a second event subscription request from a UDM. The second event subscription request carries information including, for example: a subscription event type information (e.g.: an Event ID, a first subscription event type "availability after DDN failure", or the like), notification endpoint information (e.g.: related information such as an address of the NEF for receiving the second event notification), an AF identifier, and the like. The second event subscription request further carries: an NEF reference ID.

In an exemplary implementation, this step may include the following step: the SMF receives a second event subscription request from an AMF. The second event subscription request carries information including, for example: a subscription event type information (e.g.: an Event ID, a first subscription event type "availability after DDN failure", or a second subscription event type "Downlink data delivery status", or the like), notification endpoint information (e.g.: related information such as an address of the AMF for receiving the second event notification), an AF identifier, and the like.

In an exemplary implementation, this step may include the following step: the SMF receives a second event subscription request from a PCF. The second event subscription request carries information including, for example: a subscription event type information (e.g.: an Event ID, a second subscription event type "Downlink data delivery status", or the like), notification endpoint information (e.g.: related information such as an address of the NEF for receiving the second event notification), an AF identifier, and the like.

At step 501: when the AF sends downlink data to a UE but the UE is in an unreachability state, the SMF sends the second event notification to the NEF or AMF.

The second event notification is configured to notify the NEF or the AMF of information of the AF sending downlink data, i.e., to determine which AF needs to receive the first event notification.

In an exemplary implementation, this step may include the following step: when the SMF learns that the UE is currently in an unreachability state and receives downlink data detection information from the UPF, the SMF acquires, according to the AF identifier contained in the downlink data detection information, a subscription event associated with the AF identifier; and the SMF sends to the NEF, according to the notification endpoint information of the subscription event associated with the AF identifier, a second event (such as "availability after DDN failure", or the like) notification, such as Nsmf_EventExposure_Notify which carries information including: an AF identifier, or information associated with the AF identifier, such as an NEF reference ID or the like. Alternatively, upon detecting that the downlink data of the AF is in a cache state, the SMF acquires the subscription event associated with the AF identifier according to the AF identifier; and the SMF sends to the NEF, according to the notification endpoint information of the subscription event associated with the AF identifier, a second event (such as "Downlink data delivery status", or the like) notification, such as Nsmf_EventExposure_Notify which carries information including, for example: an AF identifier, or information associated with the AF identifier, such as an NEF reference ID or the like.

In an exemplary implementation, this step may include the following step: when the SMF learns that the UE is currently in an unreachability state and receives downlink data detection information sent from the UPF, the SMF acquires, according to the AF identifier contained in the downlink data detection information, a subscription event associated with the AF identifier; and the SMF sends to the AMF, according to the notification endpoint information of the subscription event associated with the AF identifier, a second event (such as "availability after DDN failure", or the like) notification, such as Nsmf_EventExposure_Notify which carries information including, for example: an AF identifier, or information associated with the AF identifier, such as an NEF reference ID or the like. Alternatively, upon detecting that the downlink data of the AF is in a cache state, the SMF acquires the subscription event associated with the AF identifier according to the AF identifier; and the SMF sends to the AMF, according to the notification endpoint information of the subscription event associated with the AF identifier, a second event (such as "Downlink data delivery status", or the like) notification, such as Nsmf_EventExposure_Notify which carries information including, for example, an AF identifier, or information associated with the AF identifier, such as an NEF reference ID or the like.

In an exemplary implementation, if the SMF does not know that the UE is in the unreachability state, this step may be preceded by the following step: the SMF sends to the AMF a UE paging request (Namf_CommunicationN1N2MessageTransfer request) for paging the UE; and the AMF receives from the SMF a response message (Namf_CommunicationN1N2MessageTransfer response) indicating that the UE is currently in an unreachability state.

In an exemplary implementation, if the SMF knows that the UE is currently in an unreachability state, but the UPF does not inform the SMF of the identifier of the current AF sending downlink data, this step may be preceded by the following step: the SMF requests the UPF to send downlink data detection information including an AF identifier; or the SMF informs the UPF to perform downlink data caching.

In an exemplary implementation, the SMF requesting the UPF to send downlink data detection information including an AF identifier includes the following steps: the SMF sends a request for downlink data detection information to UPF; and the SMF receives from the UPF a downlink data detection information response, which may be, for example: a Downlink Data Notify, or an Sx Report, or a N4 Report.

After receiving the downlink data sent from the AF, the UPF may perform detection on the downlink data, for example, detect which AF the downlink data comes from, that is, detect an AF identifier of the AF sending downlink data.

An embodiment of the present disclosure further provides a computer-readable storage medium with computer executable instructions stored thereon. The computer executable instructions are configured to perform the event notification method described in any one of the embodiments related to FIG. 5.

An embodiment of the present disclosure further provides an apparatus for implementing event notification, including a processor and a memory. The memory has stored thereon a computer program executable on the processor and configured to: perform steps of the event notification method described in any one of the embodiments related to FIG. 5.

Figure 6:
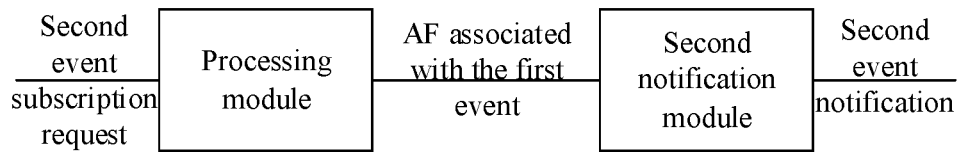
FIG. 6 is a schematic diagram illustrating configuration of another event notification apparatus according to an embodiment of the present application.

FIG. 6 is a schematic diagram illustrating configuration of another event notification apparatus according to the present application, which, as shown in FIG. 6, includes at least a processing module and a second notification module. The processing module is configured to receive a second event subscription request, and complete subscription of the second event. The second event is an event of monitoring whether the AF sends downlink data. The second notification module is configured to send, when the AF sends downlink data to a UE but the UE is in an unreachability state, the second event notification to an NEF or an AMF. The second event notification is configured to notify the NEF or the AMF of information of the AF sending downlink data.

The event notification apparatus of the present application may be provided in the SMF or may be an SMF.

In an exemplary implementation, the second notification module is specifically configured to: send to the NEF, after learning that the UE is currently in an unreachability state and receiving the downlink data detection information from the UPF, a second event notification carries information including, for example: an AF identifier, or information including an identifier associated with the AF identifier, such as an NEF reference ID or the like; or, send to the NEF, upon detecting that the downlink data is in a cache state, a second event notification carries information including: an AF identifier, or an identifier associated with the AF, such as an NEF reference ID or the like.

In an exemplary implementation, the second notification module is specifically configured to: send to the AMF, after learning that the UE is currently in an unreachability state and receiving the downlink data detection information sent from the UPF, a second event notification carries information including: an AF identifier, or an identifier associated with the AF, such as an NEF reference ID or the like, or, send to the AMF, upon detecting that the downlink data is in a cache state, a second event notification carries information including: an AF identifier, or an identifier associated with the AF, such as an NEF reference ID or the like.

In an exemplary implementation, if the SMF knows that the UE is currently in an unreachability state, but the UPF does not inform the SMF of the identifier of the current AF sending downlink data, the second notification module is further configured to: request the UPF to send downlink data detection information including an AF identifier; or inform the UPF to perform downlink data caching.

The present application is described below with reference to specific embodiments.

Figure 7:
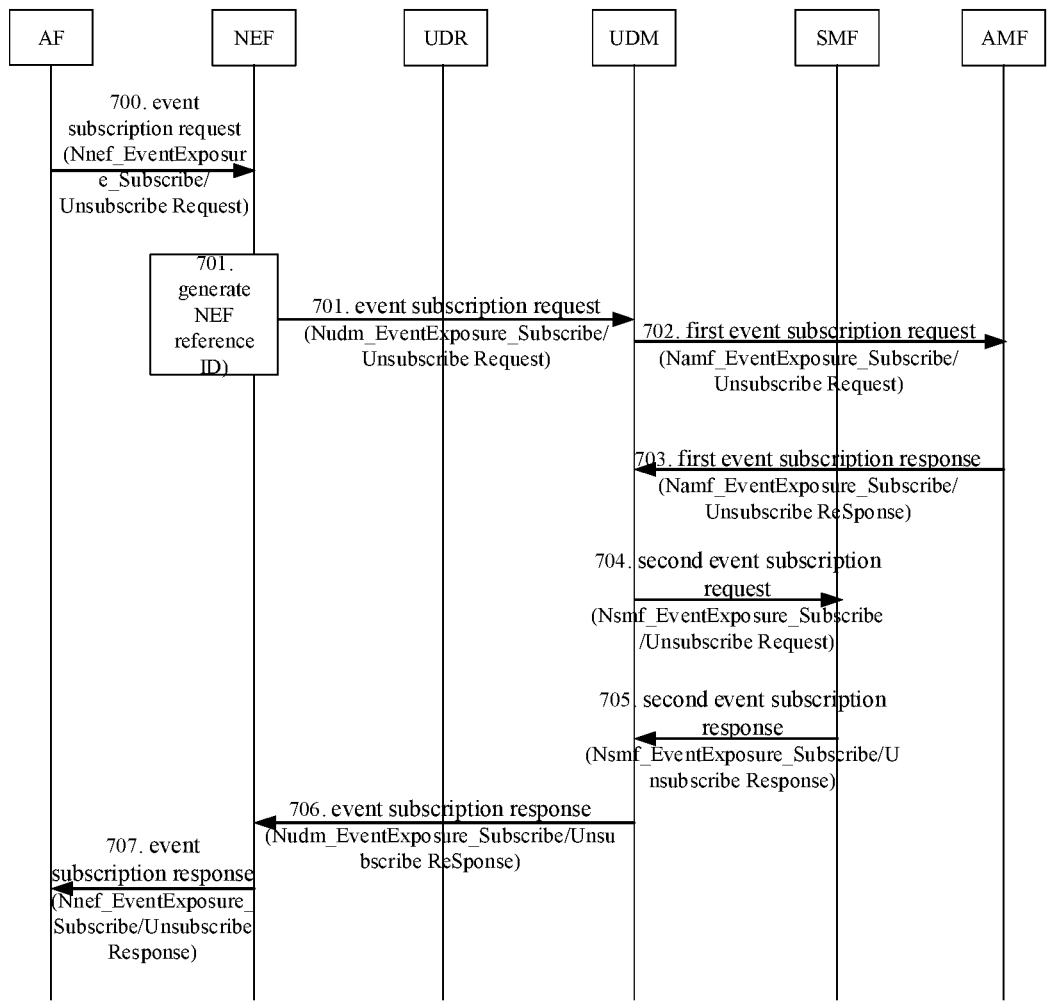
FIG. 7 is a schematic flowchart of subscribing to a first event and a second event according to an embodiment of the present application.

FIG. 7 is a schematic flowchart of subscribing to a first event and a second event according to the present application, which, as shown in FIG. 7, includes the following steps 700 to 707.

At step 700: the AF sends to the NEF an event subscription request, such as Nnef_EventExposure_Subscribe request.

The Nnef_EventExposure_Subscribe request carries information including, for example: an event type (e.g., "availability after DDN failure"), information for identifying the AF (e.g., traffic descriptor, IP filter information, an AF ID, or other information that can uniquely identify the AF identity in the entire system, which may also be referred to as AF identifier herein), a UE identifier, and the like.

At step 701: the NEF receives an event subscription request from the AF, and generates an NEF reference ID that is associated with the AF identifier. The NEF sends to the UDM an event subscription request, such as Nudm_EventExposure_subscribe request.

The Nudm_EventExposure_subscribe request carries information including, for example: an NEF reference ID, subscription event type information (such as Event ID, an event type (e.g., "availability after DDN failure"), notification endpoint information (e.g., related information such as an address of the NEF for receiving an event notification), and the like.

At steps 702 to 703: the UDM sends to the AMF a first event subscription request, such as Namf_EventExposure_subscribe request, and the AMF completes subscription of the first event and returns to the UDM a first event subscription response, such as Namf_EventExposure_subscribe response.

The first event subscription request carries, for example: an NEF reference ID, subscription event type information (such as Event ID, a first subscription event type "availability after DDN failure", or the like), notification endpoint information (e.g., related information such as an address of the NEF for receiving an event notification), monitoring endpoint information (e.g., UE identifier), or the like.

At steps 704 to 705: if the UDM receives the subscription event request message from the NEF which carries a first subscription event type "availability after DDN failure" and an AF identifier, the UDM sends to the SMF a second event subscription request, such as Nsmf_EventExposure_subscribe request, and the SMF completes subscription of the second event and returns to the UDM a second event subscription response, such as Nsmf_EventExposure_subscribe response.

The second event subscription request carries, for example: an NEF reference ID, subscription event type information (such as Event ID, a first subscription event type "availability after DDN failure", or the like), notification endpoint information (e.g., related information such as an address of the NEF for receiving an event notification), an AF identifier, and the like.

At steps 706 to 707: the UDM returns to the NEF an event subscription response, such as Nudm_EventExposure_subscribe response; and the NEF returns to the AF an event subscription response, such as Nnef_EventExposure_subscribe response.

According to the subscription process of the first event and the second event shown in this embodiment, the first event and the second event are associated with each other through information such as the NEF reference ID, the AF identifier, and the UE identifier.

The subscription of the first event and the subscription of the second event have no strict order of precedence, and FIG. 7 is merely an example and is not intended to limit the scope of the present application.

In this embodiment, the process of unsubscribing or subscription modification is similar to the process of subscribing described above, and thus is not repeated here.

Figure 8:
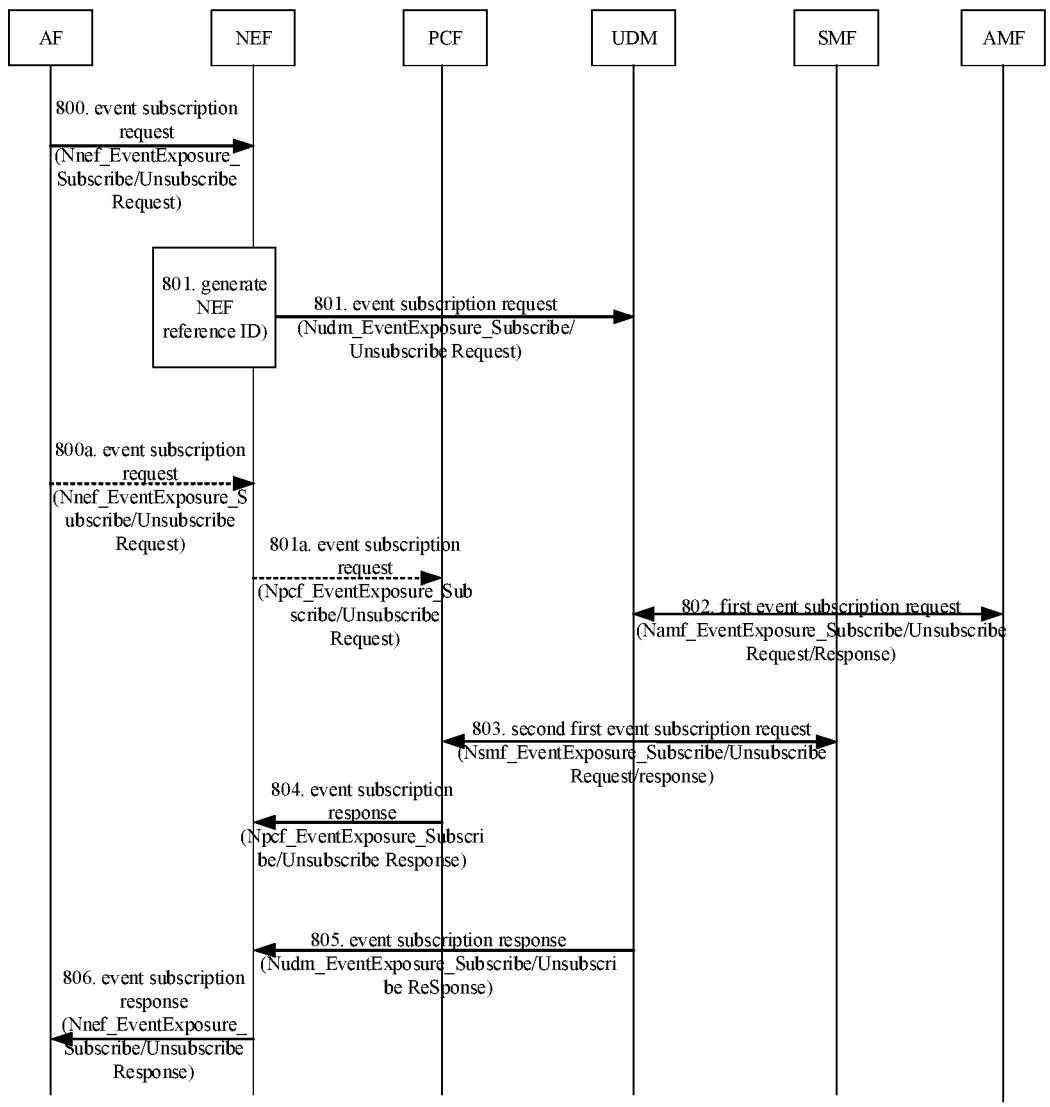
FIG. 8 is another schematic flowchart of subscribing to a first event and a second event according to an embodiment of the present application.

FIG. 8 is another schematic flowchart of subscribing to a first event and a second event according to the present application, which, as shown in FIG. 8, includes the following steps 800 to 806.

At step 800: the AF sends to the NEF an event subscription request, such as Nnef_EventExposure_Subscribe request.

The Nnef_EventExposure_Subscribe request carries information including, for example: a first subscription event type (e.g., "availability after DDN failure"), information for identifying the AF (e.g., traffic descriptor, IP filter information, an AF ID, or other information that can uniquely identify the AF identity in the entire system, which may also be referred to as AF identifier herein), a UE identifier, and the like.

In an exemplary implementation, the AF further needs to send an event subscription request to the NEF, as shown in step 800a: the AF sends to the NEF an event subscription request, such as Nnef_EventExposure_Subscribe request. The Nnef_EventExposure_Subscribe request carries information including, for example: a second subscription event type ("Downlink data delivery status"), information for identifying the AF (e.g., traffic descriptor, IP filter information, an AF ID, or other information that can uniquely identify the AF identity in the entire system, which may also be referred to as AF identifier herein), and the like.

At step 801: if the NEF receives the event subscription request shown in step 800, the NEF generates an NEF reference ID that is associated with the AF identifier; and the NEF sends to the UDM an event subscription request, such as Nudm_EventExposure_subscribe request.

The Nudm_EventExposure_subscribe request carries information including, for example: an NEF reference ID, subscription event type information (such as Event ID, a first subscription event type "availability after DDN failure", or the like), notification endpoint information (e.g., related information such as an address of the NEF for receiving an event notification), and the like.

In an exemplary implementation, if the NEF receives the event subscription request in step 800, and the subscription event type carried in the event subscription request is a first subscription event type "availability after DDN failure" and an AF identifier, or if the NEF receives the event subscription request shown in step 800a, step 801a is performed: the NEF sends to the PCF an event subscription request, such as Npcf_EventExposure_subscribe request.

The Npcf_EventExposure_subscribe request carries information including, for example: an NEF reference ID, subscription event type information (such as Event ID, a second subscription event type "Downlink data delivery status", or the like), notification endpoint information (e.g., related information such as an address of the NEF for receiving an event notification), and the like.

At step 802: the UDM sends to the AMF a first event subscription request, such as Namf_EventExposure_subscribe request, and the AMF completes subscription of the first event and returns to the UDM a first event subscription response, such as Namf_EventExposure_subscribe response.

The first event subscription request carries, for example: an NEF reference ID, subscription event type information (such as Event ID, an event type (e.g., "availability after DDN failure"), notification endpoint information (e.g., related information such as an address of the NEF for receiving an event notification), monitoring endpoint information (e.g., UE identifier), or the like.

At step 803: the PCF sends to the SMF a second event subscription request, such as Nsmf_EventExposure_subscribe request, and the SMF completes subscription of the second event and returns to the UDM a second event subscription response, such as Nsmf_EventExposure_subscribe response.

The second event subscription request carries, for example: an NEF reference ID, subscription event type information (such as Event ID, a second subscription event type "Downlink data delivery status", or the like), notification endpoint information (e.g., related information such as an address of the NEF for receiving an event notification), an AF identifier, and the like.

At step 804: the NEF returns to the PCF an event subscription response, such as Npcf_EventExposure_subscribe response.

At step 805: the NEF returns to the UDM an event subscription response, such as Nudm_EventExposure_subscribe response.

At step 806: the NEF returns to the AF an event subscription response, such as Nnef_EventExposure_subscribe response.

According to the subscription process of the first event and the second event shown in this embodiment, the first event and the second event are associated with each other through information such as the NEF reference ID, the AF identifier, and the UE identifier.

The subscription of the first event and the subscription of the second event have no strict order of precedence, and FIG. 8 is merely an example and is not intended to limit the scope of the present application.

In this embodiment, the process of unsubscribing or subscription modification is similar to the process of subscribing described above, and thus is not repeated here.

Figure 9:
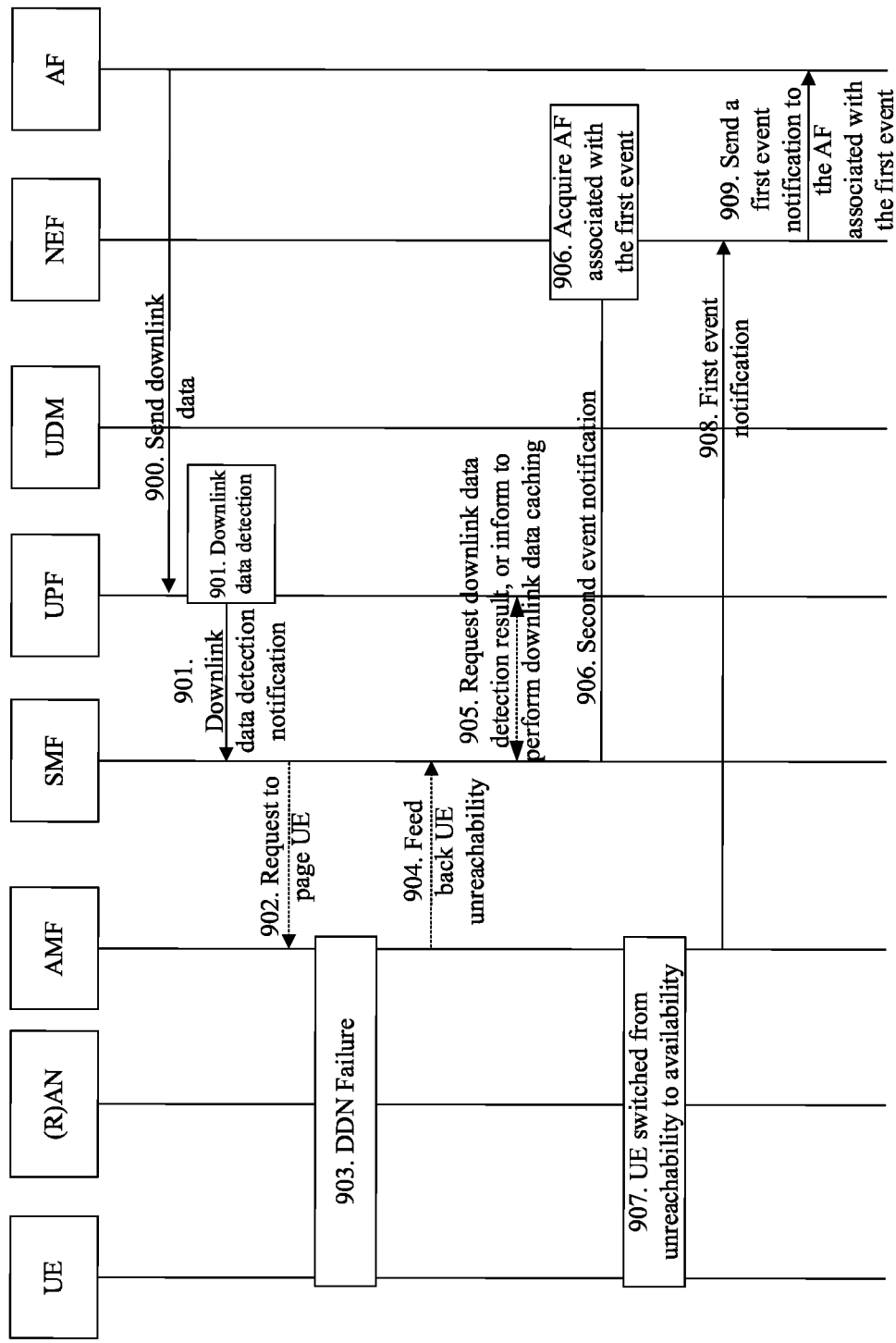
FIG. 9 is a schematic notify flowchart of a second event according to an embodiment of the present application.

FIG. 9 is a schematic notify flowchart of a second event according to the present application, which, as shown in FIG. 9, includes the following steps 900 to 909.

At step 900: the AF sends downlink data to the UPF.

At step 901: the UPF, upon receiving the downlink data, performs data detection on the downlink data, for example, detects which AF sends the downlink data; and the UPF sends to the SMF a downlink data detection notification which may be, for example, a Downlink Data Notify or an Sx Report or an N4 Report.

In an exemplary implementation, the downlink data detection notification further carries the detected AF identifier.

In an exemplary implementation, if the SMF does not know that the UE is in the unreachability state, the method may further include step 902: the SMF requests the AMF to page the UE, where the request message may be, for example: Namf_CommunicationN1N2MessageTransfer request.

At step 903: the UE is in an unreachability state, and the paging to the UE fails, i.e., DDN failure.

In an exemplary implementation, the method may further include step 904:

the AMF feeds back to the SMF that the UE is currently in an unreachability state. The feedback message may be, for example: Namf_CommunicationN1N2MessageTransfer response.

In an exemplary implementation, if the SMF knows that the UE is currently in an unreachability state, but the UPF does not inform the SMF of the identifier of the current AF sending downlink data, the method may further include step 905: the SMF requests the UPF to send downlink data detection information including an AF identifier; or the SMF informs the UPF to perform downlink data caching.

At step 906: when the SMF learns that the UE is currently in an unreachability state and receives downlink data detection information from the UPF, the SMF sends a second event (e.g., "availability after DDN failure") to the NEF via the NEF reference ID associated with the AF identifier. The second event notification may be, for example, Nsmf_EventExposure_Notify, which carries information including: an AF identifier, or information associated with the AF identifier, such as an NEF reference ID or the like. Alternatively, upon detecting that the downlink data is in a cache state, the SMF sends a second event (e.g., "Downlink data delivery status") notification to the NEF via the NEF reference ID associated with the AF identifier. The second event notification may be, for example, Nsmf_EventExposure_Notify, which carries information including: an AF identifier, or information associated with the AF identifier, such as an NEF reference ID or the like.

The NEF receives from the SMF, the second event notification carrying the AF identifier, or information associated with the AF identifier, such as an NEF reference ID, and sets a Notify-on-available-after-DDN-failure identifier associated with the AF identifier, that is, acquires information of the AF sending downlink data.

The Notify-on-available-after-DDN-failure identifier is associated with the first event. In other words, if the Notify-on-available-after-DDN-failure identifier is set, the first event notification indicating subsequent first events need to be sent to the associated AF.

At step 907: the UE is switched from an unreachability state to an availability state.

At step 908: after learning that the UE is available, the AMF sends to the NEF a first event notification, such as Namf_EventExposure_Notify which carries information including an NEF reference ID.

At step 909: upon receiving the first event notification from the AMF, the NEF, according to the set Notify-on-available-after-DDN-failure identifier, sends a first event notification to the associated AF, i.e., the AF sending downlink data.

Figure 10:
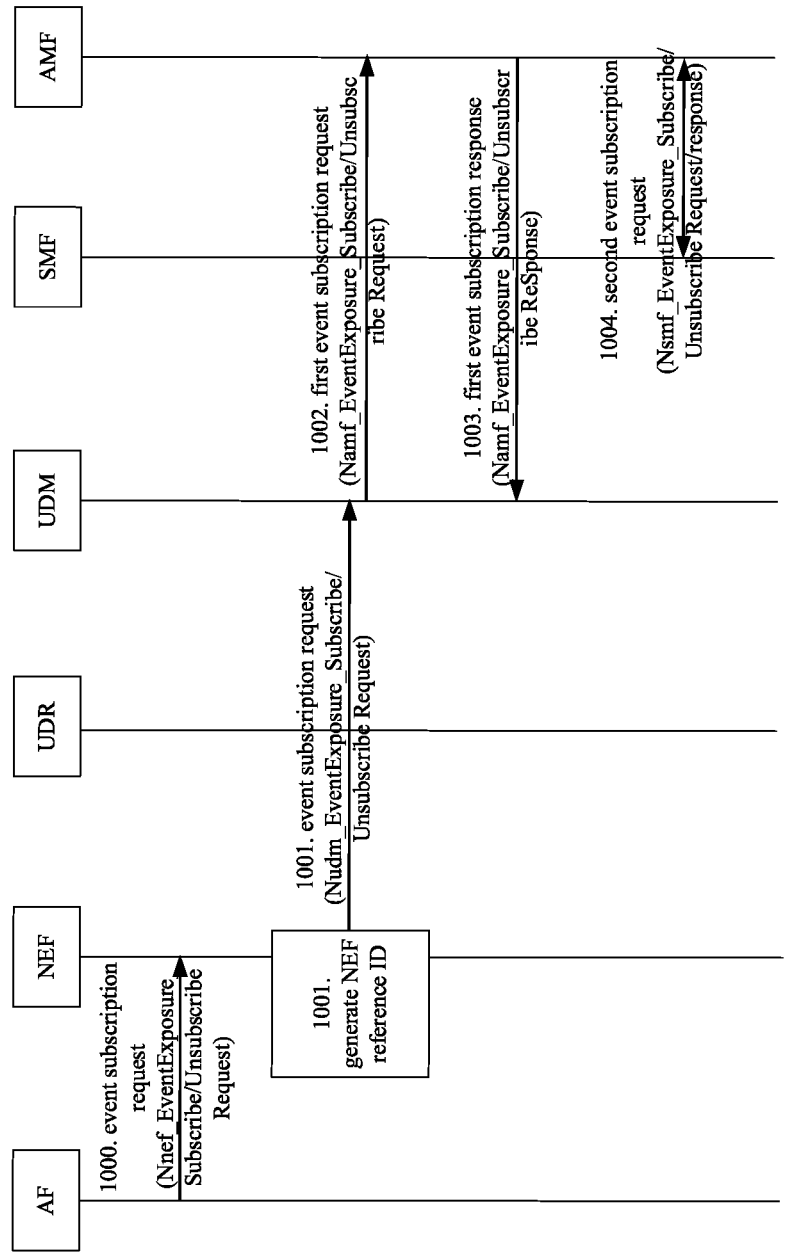
FIG. 10 is yet another schematic flowchart of subscribing to a first event and a second event according to an embodiment of the present application.

FIG. 10 is another schematic flowchart of subscribing to a first event and a second event according to the present application, which, as shown in FIG. 10, includes the following steps 1000 to 1004.

At step 1000: the AF sends to the NEF an event subscription request, such as Nnef_EventExposure_Subscribe request.

The Nnef_EventExposure_Subscribe request carries information including, for example: a first subscription event type (e.g., "availability after DDN failure"), information for identifying the AF (e.g., traffic descriptor, IP filter information, an AF ID, or other information that can uniquely identify the AF identity in the entire system, which may also be referred to as AF identifier herein), a UE identifier, and the like.

At step 1001: the NEF receives an event subscription request from the AF, and generates an NEF reference ID that is associated with the AF identifier. The NEF sends to the UDM an event subscription request, such as Nudm_EventExposure_subscribe request.

The Nudm_EventExposure_subscribe request carries information including, for example: an NEF reference ID, subscription event type information (such as Event ID, a first subscription event type "availability after DDN failure", or the like), notification endpoint information (e.g., related information such as an address of the NEF for receiving an event notification), and the like.

At steps 1002 to 1003: the UDM sends to the AMF a first event subscription request, such as Namf_EventExposure_subscribe request, and the AMF completes subscription of the first event and returns to the UDM a first event subscription response, such as Namf_EventExposure_subscribe response.

The first event subscription request carries, for example: an NEF reference ID, subscription event type information (such as Event ID, a first subscription event type "availability after DDN failure", or the like), notification endpoint information (e.g., related information such as an address of the NEF for receiving an event notification), monitoring endpoint information (e.g., UE identifier), or the like.

At step 1004: the AMF sends to the SMF a second event subscription request, such as Nsmf_EventExposure_subscribe request, and the SMF completes subscription of the first event and returns to the AMF a first event subscription response, such as Nsmf_EventExposure_subscribe response.

The second event subscription request carries, for example: an NEF reference ID, subscription event type information (such as Event ID, a subscription event type being a first subscription event type "availability after DDN failure", or a second subscription event type "Downlink data delivery status", or the like), notification endpoint information (e.g., related information such as an address of the AMF for receiving an event notification), an AF identifier, and the like.

The subscription of the first event and the subscription of the second event have no strict order of precedence, and FIG. 10 is merely an example and is not intended to limit the scope of the present application.

In this embodiment, the process of unsubscribing or subscription modification is similar to the process of subscribing described above, and thus is not repeated here.

Figure 11:
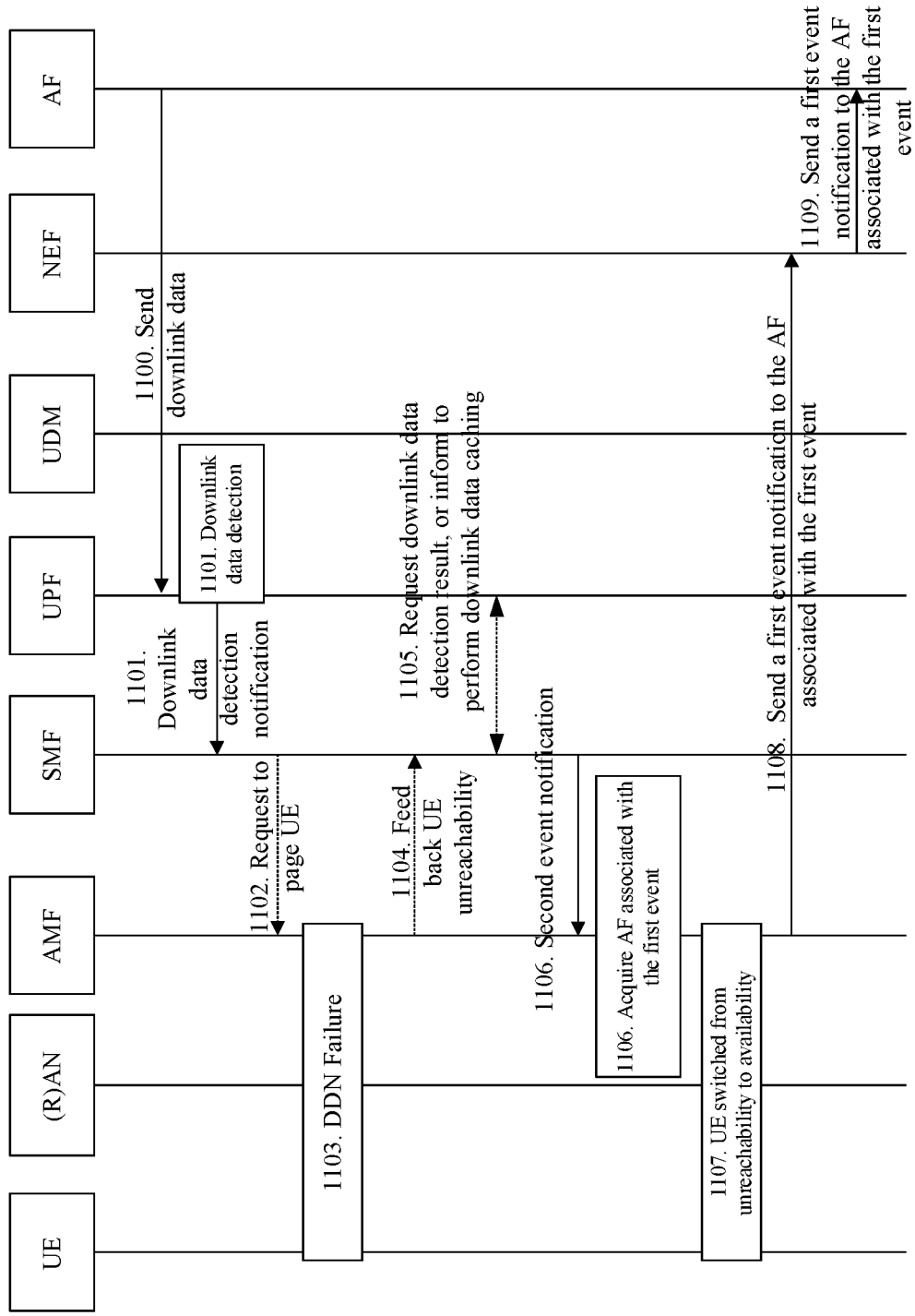
FIG. 11 is another schematic notify flowchart of a second event according to an embodiment of the present application.

FIG. 11 is a schematic notify flowchart of another a second event according to the present application, which, as shown in FIG. 11, includes the following steps 1100 to 1109.

At step 1100: the AF sends downlink data to the UPF.

At step 1101: the UPF, upon receiving the downlink data, performs data detection on the downlink data, for example, detects which AF sends the downlink data; and the UPF sends to the SMF a downlink data detection notification which may be, for example, a Downlink Data Notify or an Sx Report or an N4 Report.

In an exemplary implementation, the downlink data detection notification further carries the detected AF identifier.

In an exemplary implementation, if the SMF does not know that the UE is in the unreachability state, the method may further include step 1102: the SMF requests the AMF to page the UE, where the request message may be, for example: Namf_CommunicationN1N2MessageTransfer request.

At step 1103: the UE is in an unreachability state, and the paging to the UE fails, i.e., DDN failure.

In an exemplary implementation, the method may further include step 1104: the AMF feeds back to the SMF that the UE is currently in an unreachability state. The feedback message may be, for example: Namf_CommunicationN1N2MessageTransfer response.

In an exemplary implementation, if the SMF knows that the UE is currently in an unreachability state, but the UPF does not inform the SMF of the identifier of the current AF sending downlink data, the method may further include step 1105: the SMF requests the UPF to send downlink data detection information including an AF identifier; or the SMF informs the UPF to perform downlink data caching.

At step 1106: when the SMF learns that the UE is currently in an unreachability state and receives downlink data detection information from the UPF, the SMF sends to the AMF a second event (such as "availability after DDN failure", or the like) notification. The second event notification may be, for example, Nsmf_EventExposure_Notify, which carries information including: an AF identifier, or information associated with the AF identifier, such as an NEF reference ID or the like. Alternatively, upon detecting that the downlink data is in a cache state, the SMF sends to the AMF a second event (such as "Downlink data delivery status") notification. The second event notification may be Nsmf_EventExposure_Notify which carries information including, for example, an AF identifier, and the like.

The AMF receives from the SMF, the second event notification carrying the AF identifier, and sets a Notify-on-available-after-DDN-failure identifier associated with the AF identifier, that is, acquires information of the AF sending downlink data.

The Notify-on-available-after-DDN-failure identifier is associated with the first event. In other words, if the Notify-on-available-after-DDN-failure identifier is set, the first event notification indicating subsequent first events need to be sent to the associated AF.

At step 1107: the UE is switched from an unreachability state to an availability state.

At step 1108: after learning that the UE is available, the AMF sends to the NEF, according to the set Notify-on-available-after-DDN-failure identifier, a first event notification of the associated AF that is the AF sending downlink data, such as Namf_EventExposure_Notify which carries information including an NEF reference ID.

At step 1109: the NEF receives from the AMF, a first event notification, and forwards the first event notification to the AF.

What is claimed is:

1. An event notification method, comprising:
    sending, by an Access Management Function (AMF), a second event subscription request to a Session Management Function (SMF);
    acquiring, by the AMF according to a second event notification from the SMF, information of an Application Function (AF) sending downlink data;
    sending, by the AMF via a Network Exposure Function (NEF) according to the acquired information of the AF sending downlink data, a first event notification to the AF sending downlink data;
    wherein the second event is an event of monitoring whether the AF sends downlink data, and the first event is a User Equipment (UE) availability after Downlink Data Notify (DDN) failed event.

2. The method according to claim 1, wherein the step of acquiring, by the AMF according to the second event notification from the SMF, information of the AF sending downlink data comprises:
    receiving, by the AMF from the SMF, the second event notification carrying an AF identifier or an identifier associated with the AF; and
    setting, by the AMF according to the received AF identifier or the identifier associated with the AF, a Notify-on-available-after-DDN-failure identifier associated with the AF.

3. The method according to claim 1, wherein the step of sending, by the AMF via the NEF, the first event notification to the AF sending downlink data comprises:
    sending, by the AMF via the NEF when the AMF detects that the UE is switched from an unreachability state to an availability state, the first event notification to the AF sending downlink data according to a Notify-on-available-after-DDN-failure identifier.

4. The method according to claim 1, before acquiring information of the AF sending downlink data, further comprises:
    receiving, by the AMF, a first event subscription request from a Unified Data Management (UDM) function for subscribing the first event, and completing subscription of the first event;
    wherein the first event subscription request carries information comprising: an NEF reference ID, a first subscription event type, notification endpoint information and monitoring endpoint information.

5. An event notification apparatus, comprising a processor and a memory having a computer program stored therein, which when executed by the processor, causes the processor to:
    send a second event subscription request to a Session Management Function (SMF) and acquire, according to a second event notification from the SMF, information of an Application Function (AF) sending downlink data;
    send a first event notification to the AF sending downlink data according to the acquired information of the AF sending downlink data;
    wherein the second event is an event of monitoring whether the AF sends downlink data, and the first event is a User Equipment (UE) availability after DDN failed event, wherein the event notification apparatus is provided in an Access Management Function (AMF), or the event notification apparatus is an AMF.

6. The apparatus according to claim 5, wherein when the computer program is executed by the processor, the processor is further configured to:
receive the second event notification carrying an AF identifier or an identifier associated with the AF from the SMF; and set, according to the received AF identifier or the identifier associated with the AF, a Notify-on-available-after-DDN-failure identifier associated with the AF.

7. The apparatus according to claim 5, wherein when the computer program is executed by the processor, the processor is configured to: send, via a Network Exposure Function (NEF) according to the acquired information of the AF sending downlink data, the first event notification to the AF sending downlink data.

8. An event notification method, comprising:
receiving, by a Session Management Function (SMF), a second event subscription request from an Access Management Function (AMF), and completing subscription of a second event; wherein the second event is an event of monitoring whether an Application Function (AF) sends downlink data, and
sending, by the SMF when the AF sends downlink data to a User Equipment (UE) but the UE is in an unreachability state, a second event notification to the AMF;
wherein the second event notification is configured to notify the AMF of information of the AF sending downlink data.

9. The method according to claim 8, wherein the second event subscription request carries information comprising: a first or second subscription event type, notification endpoint information configured as an AMF-related address, and an AF identifier.

10. The method according to claim 9, wherein
the first subscription event type comprises: a UE availability after DDN failure type; and
the second subscription event type comprises: a downlink data delivery status type.

11. The method according to claim 8, wherein the step of sending, by the SMF, the second event notification to the AMF comprises:
acquiring, by the SMF when learning that the UE is currently in an unreachability state and receiving downlink data detection information from a User Plane Function (UPF), a subscription event associated with an AF identifier according to the AF identifier contained in the downlink data detection information; sending, by the SMF to the AMF according to notification endpoint information of the subscription event associated with the AF identifier, the second event notification carrying an AF identifier or an identifier associated with the AF; or, acquiring, by the SMF when detecting that the downlink data of the AF is in a cache state, the subscription event associated with the AF identifier according to the AF identifier; and sending, by the SMF to the AMF according to the notification endpoint information of the subscription event associated with the AF identifier, the second event notification carrying an AF identifier or an identifier associated with the AF.

12. The method according to claim 8, before sending, by the SMF, the second event notification to the AMF, further comprising:
requesting, by the SMF, the UPF to send downlink data detection information comprising an AF identifier; or,
informing, by the SMF, the UPF to perform downlink data caching.

13. An event notification apparatus, comprising a processor and a memory having a computer program stored therein, which when executed by the processor, causes the processor to perform the method of claim 8,
wherein the event notification apparatus is provided in a Session Management Function (SMF), or the event notification apparatus is an SMF.

14. The apparatus according to claim 13, wherein the second event subscription request carries information comprising: a first or second subscription event type, notification endpoint information configured as an AMF-related address, and an AF identifier.

15. The apparatus according to claim 13, wherein when the computer program is executed by the processor, the processor is further configured to:
acquire, when learning that the UE is currently in an unreachability state and receiving downlink data detection information from a User Plane Function (UPF), a subscription event associated with an AF identifier according to the AF identifier contained in the downlink data detection information; send to the AMF, according to notification endpoint information of the subscription event associated with the AF identifier, the second event notification carrying an AF identifier or an identifier associated with the AF; or,
acquire, when detecting that the downlink data of the AF is in a cache state, the subscription event associated with the AF identifier via the AF identifier; and send to the AMF, according to the notification endpoint information of the subscription event associated with the AF identifier, the second event notification carrying an AF identifier or an identifier associated with the AF.

16. The apparatus according to claim 13, wherein when the computer program is executed by the processor, the processor is further configured to:
request the UPF to send downlink data detection information comprising an AF identifier; or inform the UPF to perform downlink data caching.

* * * * *